(12) United States Patent
Mattiuzzo

(10) Patent No.: US 6,930,237 B2
(45) Date of Patent: Aug. 16, 2005

(54) DEVICE FOR CONVERTING SOLAR RADIATION INTO ELECTRIC POWER

(76) Inventor: Gilberto Mattiuzzo, Vicolo Schiavonesca, 55, 31040 Volpago del Montello (IT)

( * ) Notice: Subject to any disclaimer, the term of this patent is extended or adjusted under 35 U.S.C. 154(b) by 0 days.

(21) Appl. No.: 10/289,322

(22) Filed: Nov. 7, 2002

(65) Prior Publication Data

US 2003/0094194 A1 May 22, 2003

(30) Foreign Application Priority Data

Nov. 20, 2001 (IT) .................................. TV20010055 U

(51) Int. Cl.[7] .......................................... H01L 31/042
(52) U.S. Cl. ...................... 136/251; 136/244; 136/291; 136/293; 136/246; 136/259; 257/433
(58) Field of Search ................................ 136/251, 244, 136/291, 293, 246, 259; 257/433

(56) References Cited

U.S. PATENT DOCUMENTS

| | | | | |
|---|---|---|---|---|
| 4,211,211 A | * | 7/1980 | Toomey et al. | 126/652 |
| 4,441,143 A | * | 4/1984 | Richardson, Jr. | 362/183 |
| 4,630,791 A | * | 12/1986 | Chapman | 244/173 |
| 5,121,307 A | * | 6/1992 | Moore | 362/183 |
| 5,149,188 A | * | 9/1992 | Robbins | 362/183 |
| 5,172,711 A | * | 12/1992 | Mueller et al. | 135/16 |
| 5,317,145 A | * | 5/1994 | Corio | 250/203.4 |
| 6,060,658 A | * | 5/2000 | Yoshida et al. | 136/243 |
| 6,106,970 A | * | 8/2000 | Kalarney | 429/96 |
| 6,123,067 A | * | 9/2000 | Warrick | 126/593 |
| 6,455,767 B1 | * | 9/2002 | Muller | 136/245 |

FOREIGN PATENT DOCUMENTS

| | | | |
|---|---|---|---|
| JP | 8-88389 A | | 4/1996 |
| JP | 11-168228 A | * | 6/1996 |
| JP | 10-341543 A | | 12/1998 |
| JP | 2001-230433 A | * | 8/2001 |

OTHER PUBLICATIONS

Patent Abstracts of Japan vol. 1999, No. 03, Mar. 31, 1999, for JP 10–341543 A.
Patent Abstracts of Japan vol. 1996, No. 8, Aug. 30, 1996, for JP 8–88389 A.

* cited by examiner

*Primary Examiner*—Alan Diamond
(74) *Attorney, Agent, or Firm*—Guido Modiano; Albert Josif; Daniel O'Byrne

(57) ABSTRACT

A device for converting solar radiation into electric power, constituted by a substantially vertically elongated body from which multiple supporting arms for one or more modules constituted by multiple photovoltaic cells protrude in an upward region. The body is hollow and contains an inverter suitable for the conversion of electric power.

13 Claims, 3 Drawing Sheets

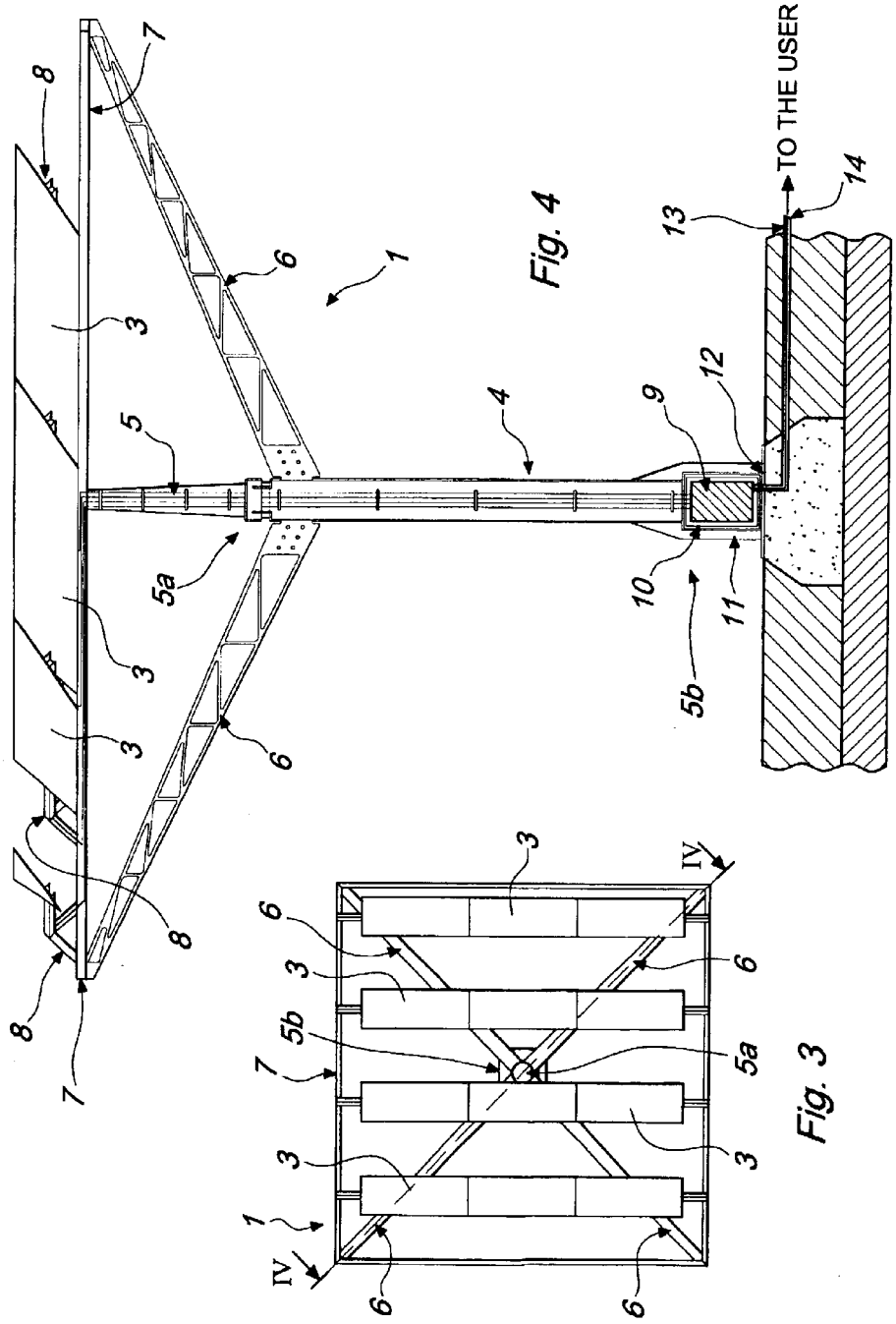

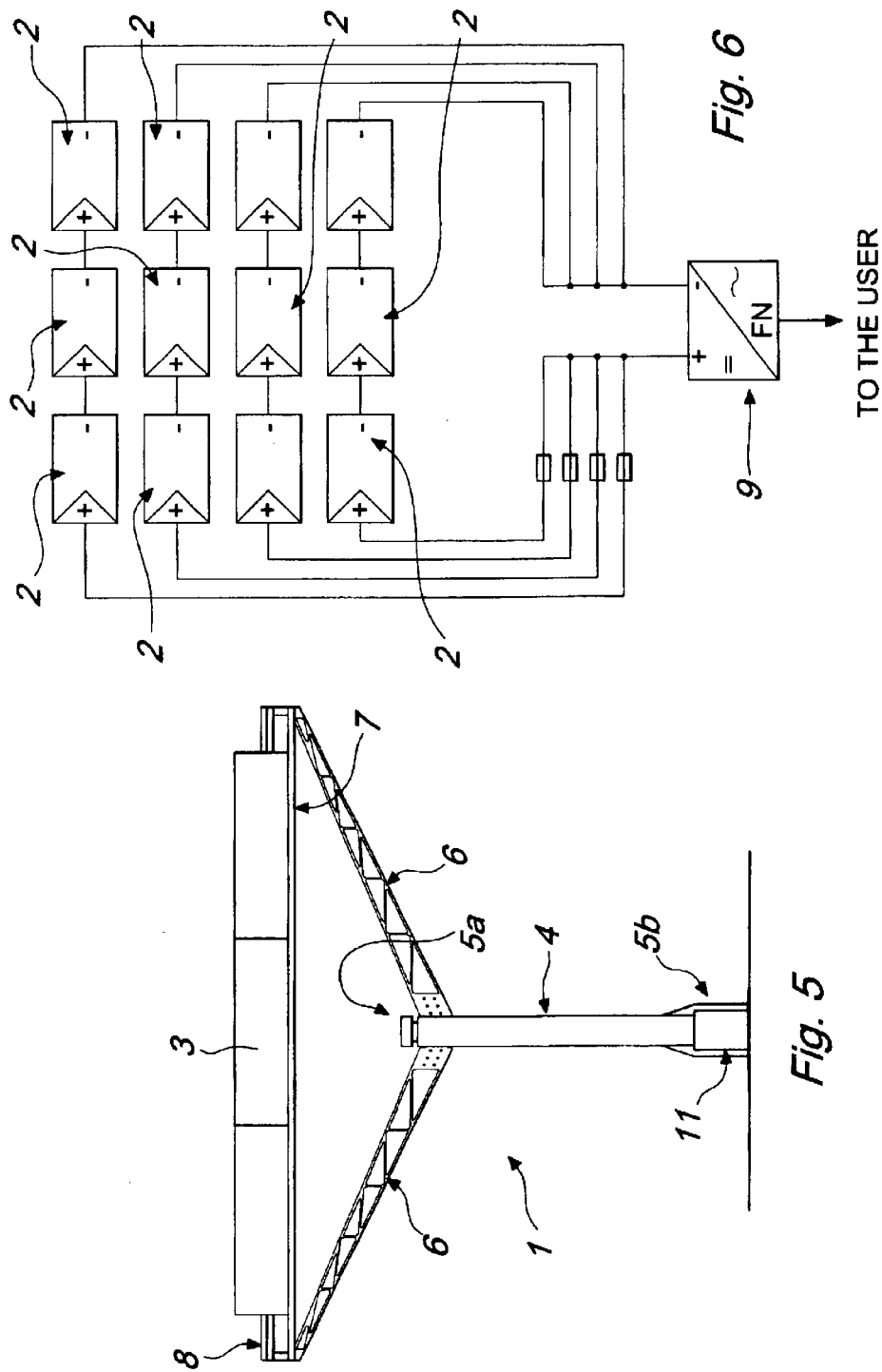

DEVICE FOR CONVERTING SOLAR RADIATION INTO ELECTRIC POWER

BACKGROUND OF THE INVENTION

The present invention relates to a device for converting solar radiation into electric power.

Currently, the utilization of alternative energies, such as wind power and solar energy, has become increasingly important.

In particular, over the last decades the technology related to the conversion of solar radiation into electric power has been improving; currently this conversion is commonly performed by using photovoltaic cells of a known type, such as monocrystalline or polycrystalline cells.

The photovoltaic cells are arranged in succession one next to the other, so as to form a so-called photovoltaic panel or module.

Known kinds of device for converting solar radiation into electric power are usually constituted by a square or rectangular photovoltaic module that is arranged on the roof of a building and is connected to a separate device for converting direct current to alternating current, commonly known as an inverter.

The inverter can be arranged to the side of the photovoltaic module or, preferably, can be installed inside the home, sheltered from atmospheric agents and any damage.

The main disadvantage of this constructive solution is that, quite often, installation of the photovoltaic modules or panels on the roofs of buildings cannot be performed in a manner that provides the best conditions of performance.

This occurs often, and is due to the fact that the available surfaces have a preset orientation, which is often considerably different from the optimum orientation determined by the geographical position of the home and by the mean path of the sun across the sky.

This drawback entails a net loss of the quantity of irradiation, which leads to a reduced yield of the device.

Since the cost of the known types of device for converting solar radiation into electric power is currently still rather high and entails very long plant amortization times, a sharp loss in performance, possibly as high as 50%, leads to a drastic increase in amortization times or worse still to the choice not to purchase this kind of device.

Another drawback of known types of device relates to the fact that at certain times of day the roof of the building can be covered by shadows cast by taller nearby buildings, and this also causes a loss of performance.

Buildings which comprise photovoltaic modules embedded directly in the walls have recently been built.

The drawbacks of this solution are the same ones noted above, since by being arranged generally vertically their orientation is in any case not the optimum one and the possibility of being covered by shadows is even greater because of the fact that they are at a lower height from the ground.

In order to achieve optimum orientation and therefore optimum yield, it is known to provide a known type of device for converting solar radiation into electric power by installing photovoltaic modules at ground level.

To obtain the intended inclination with respect to the ground, these photovoltaic modules are associated with a support for connection to the ground or for resting thereon.

One drawback of this constructive solution consists of the fact that said panels or modules, which necessarily have a large surface of exposure to the sun, constitute a considerable bulk and space occupation at the ground where they are located.

Another drawback is the fact that they are even more subject to be covered by shadows cast by trees or other buildings, since they are located almost at ground level.

Another problem of these known types is the fact that they can be accessed easily by anyone, and this can entail a risk due to their possible damage or even their theft.

SUMMARY OF THE INVENTION

The aim of the present invention is therefore to solve the noted technical problems, eliminating the drawbacks of the cited known art and thus providing an invention that allows to provide optimum collection of solar radiation and its conversion into electric power, regardless of the orientation of the home or of the user device intended to utilize said electric current.

Within this aim, an object is to provide an invention that can be orientated beforehand in the optimum manner, according to the geographical position, to the shape of the ground and to the presence of buildings in the vicinity.

Another important object is to provide a device that can be installed in regions that cannot be reached easily by shadows.

Another object is to provide an invention that is aesthetically pleasant and therefore can also be used as a street furniture element.

Another object is to obtain an invention that cannot be damaged or removed easily.

Another object is to avoid occupying a large portion of space, said space being usable for other purposes.

Another object is to provide a device that can be installed easily and rapidly and can be connected to the mains or to the building to be powered very simply and rapidly even by an unspecialized person.

Another object is to provide an invention that is structurally simple and has modest manufacturing costs.

This aim and these and other objects that will become better apparent hereinafter are achieved by a device for converting solar radiation into electric power as per claim 1.

BRIEF DESCRIPTION OF THE DRAWINGS

Further characteristics and advantages of the invention will become better apparent from the detailed description of a particular embodiment thereof, illustrated only by way of non-limitative example in the accompanying drawings, wherein:

FIG. 1 is a perspective view of the device for converting solar radiation into electric power;

FIGS. 2 and 3 are respectively a top view and a side view of the invention;

FIG. 4 is a sectional view of the invention, taken along the vertical plane shown in FIG. 3;

FIG. 5 is a front view of the invention;

FIG. 6 is a schematic view of the electrical connection between the photovoltaic cells and the inverter.

DESCRIPTION OF THE PREFERRED EMBODIMENTS

Figures 1, 2:
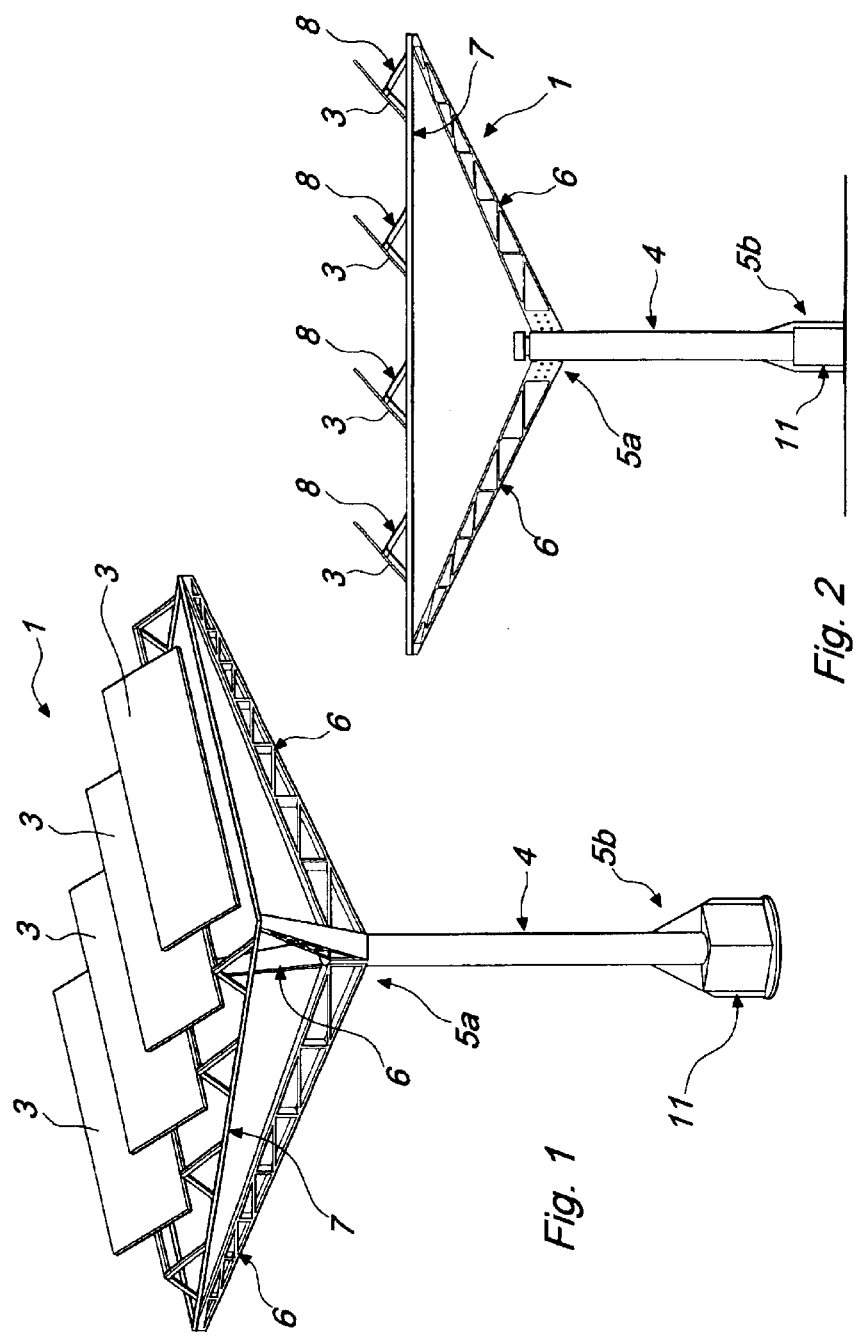

With reference to the figures, the reference numeral 1 designates a device for converting solar radiation into electric power, comprising a plurality of photovoltaic cells, schematically designated by the reference numeral 2 in FIG. 6, which are clustered into a plurality of photovoltaic modules or panels, designated by the reference numeral 3.

The device 1 is constituted by a body 4 that is substantially vertically elongated and from which multiple arms 6 protrude approximately in the vicinity of the upper end 5a of said body 4 or thereat.

In the particular embodiment described here merely by way of example, said arms 6, which are four, protrude radially and upward from said upper end 5a so as to support a frame 7 that is advantageously square or rectangular.

Said frame 7 is advantageously formed, for example, by structural elements or tubular elements that are arranged so as to form a structure that is suitable to act as a support and resting element for said modules 3.

The connection between the modules 3 and the frame 7, is preferably provided by means of brackets supports, designated by the reference numeral 8, which are arranged transversely to the frame 7 and allow to orientate the modules 3 at a given angle with respect to a horizontal plane.

The photovoltaic modules 3, which lie on mutually parallel and equidistant planes, are suitable to convert the incident solar radiation into electric power; in particular, into electric current, such as 12-volt direct current.

The generated direct current is carried, by means of suitable electric cables 5 arranged inside or outside the body 4 and one or more of the arms 6, into a device for converting direct current into alternating current, which may be of a known type such as that commonly known as inverter, which is designated by the reference numeral 9 in the figures.

In the embodiment shown in FIG. 4, the body 4, which is conveniently hollow, has an internal seat 10 that advantageously can be accessed from the inside and is suitable to contain said inverter 9 and optionally other means suitable to convert electric power, such as for example safety devices or a separate voltage transformer.

Said seat 10 is advantageously formed approximately at the lower end, designated by the reference numeral 5b, of the body 4.

Said lower end 5b further comprises means for connection to the ground, constituted for example by a base 11 that is preferably made of metallic material and is associated with a lower flat surface 12.

The connection between the lower surface, which is preferably made of concrete or stone and can also be constituted by the structure of the ground itself, is provided by virtue of mechanical means of a known type, such as for example screws, pins or nails.

The body 4 advantageously has a height that is proximate to, or greater than, two meters, so as to allow the free passage of a person or vehicle beneath it.

In output from the base 11, moreover, the invention has electrical coupling means 13 for connection to the mains, for feeding and selling electric current to an electric grid management company, and also electrical coupling means 14 for connection to a device or building to be powered, such as one or more outlets of a known type.

As an alternative, as shown in FIG. 4, it is possible to bury the cables underground, so as to avoid tampering or damage thereto.

Operation is therefore as follows: with reference to FIG. 1, the device 1 can be installed advantageously at the chosen site, which can be any sunlit site not far from the user device to be powered, or in any case reachable with electrical cables.

The device must be arranged on a flat and rigid surface, such as for example ground covered with asphalt or cement.

If it necessary to place the device 1 on soft terrain, such as the grassy soil of a garden, it is convenient to provide a footing or rigid resting plate such as the surface 12 to which the base 11 of said structure can be rigidly coupled.

Once the device has been positioned, it is sufficient to provide the connection to the users and/or to the grid, and this connection can be performed simply, optionally even by the user.

It has thus been found that the invention has achieved the intended aim and objects, a device for converting solar radiation into electric power having been devised that allows to provide optimum collection of solar radiation, since it can be installed so that it can be orientated beforehand in the optimum manner, depending on the geographical location, the shape of the terrain and the presence of buildings in the vicinity.

The invention can be installed easily in a site that is conveniently distant from shadows of trees or of other buildings, according to the most favorable orientation.

Moreover, it is aesthetically pleasant, and therefore can also be used as a street furniture element.

Since the photovoltaic modules are at a certain height from the ground, they cannot be accessed easily and therefore cannot be damaged or removed easily, and at the same time the device ensures that the space around the body 4 is available; said space can be used, for example, as a parking area or as a shaded area, for example in the garden, for leisure.

The illustrated device for converting solar radiation into electric power can also be used in groups of two or more devices connected in parallel, so as to supply the overall energy required.

The materials used and the dimensions that constitute the individual components of the invention may of course be more pertinent according to the specific requirements.

The various means for performing certain different functions need not certainly coexist only in the illustrated embodiment but can be present per se in many embodiments, even in ones that are not illustrated.

The disclosures in Italian Utility Model Application No. TV2001U000055 from which this application claims priority are incorporated herein by reference.

What is claimed is:

1. A device for converting solar radiation into electric power, comprising a vertically elongated body, multiple supporting arms protruding from said elongated body at an upward region thereof said arms supporting a supporting and resting frame, said frame being made of supporting elements selected from structural and tubular elements that are fixed and arranged so as to constitute a support for at least one flat panel which comprises a plurality of photovoltaic cells distributed therein, said device further comprising any of brackets and supports which provide connection between said at least one panel and said frame, said brackets and supports being arranged transversely to said frame so as to allow to orientate said at least one panel at a selected angle with respect to a horizontal plane.

2. The device of claim 1, further comprising conversion means for converting electric power, said elongated body being hollow and made so as to contain said conversion means.

3. The device of claim 1, wherein said arms are arranged so as to protrude radially and upward from the upper end of said body.

4. The device of claim 3, having four of said arms.

5. The device of claim 1, wherein said frame is rectangular or square.

6. The device of claim 1, comprising at least two of said panels with photovoltaic cells distributed therein which have identical dimensions and are arranged on said frame so as to lie on mutually parallel and equidistant planes that are inclined with respect to a horizontal plane.

7. The device of claim 2, further comprising electrical cables, which are arranged on a path provided in any of a location inside and outside said body and inside and outside at least one of said arms, for transmitting generated electric current to said conversion means.

8. The device of claim 7, wherein said conversion means comprises at least one device for converting direct current into alternating current.

9. The device of claim 8, comprising a seat provided so as to be inspectionable from outside, which is formed at a lower end of said elongated body, said conversion means being accommodated in said seat.

10. The device of claim 9, further comprising connection means located at said lower end of said elongated body for providing electrical connection to the ground, said connection means comprising a base preferably made of metallic material, wherein said base is coupled with a flat and rigid lower surface.

11. The device of claim 10, wherein said vertically elongated body has a height of at least two meters.

12. The device of claim 11, wherein said elongated body is constituted by any of a longitudinally elongated shaft, a column and a pillar, arranged vertically.

13. The device of claim 10, further comprising electrical coupling means provided at the lower end of said elongated body for connection to a mains and to user devices.

* * * * *